[15.]
F. Alsip. Brick Machine.
No. 118,504.   Fig. 1.   Patented Aug. 29, 1871.
2 Sheets.
Sheet 1.
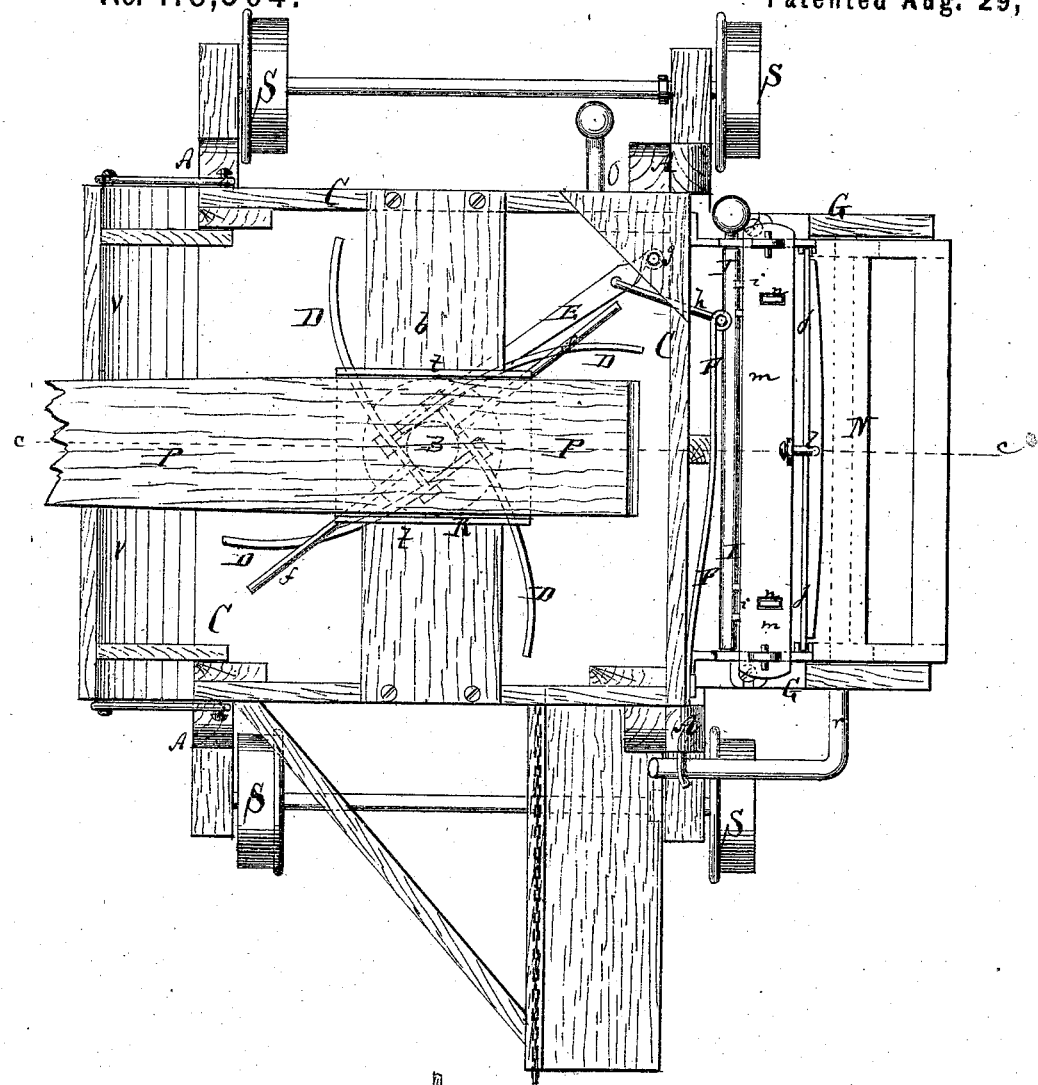
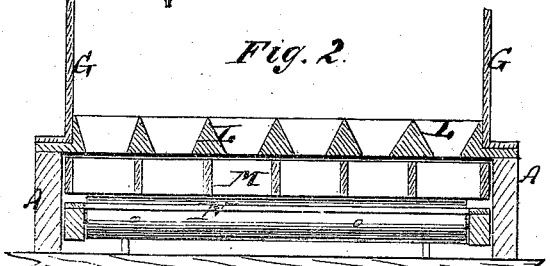
Fig. 2.
Witnesses:
E. Wolff.
Wm. H. C. Smith.
Inventor:
F. Alsip.
Per Munn & Co.
Attorneys.

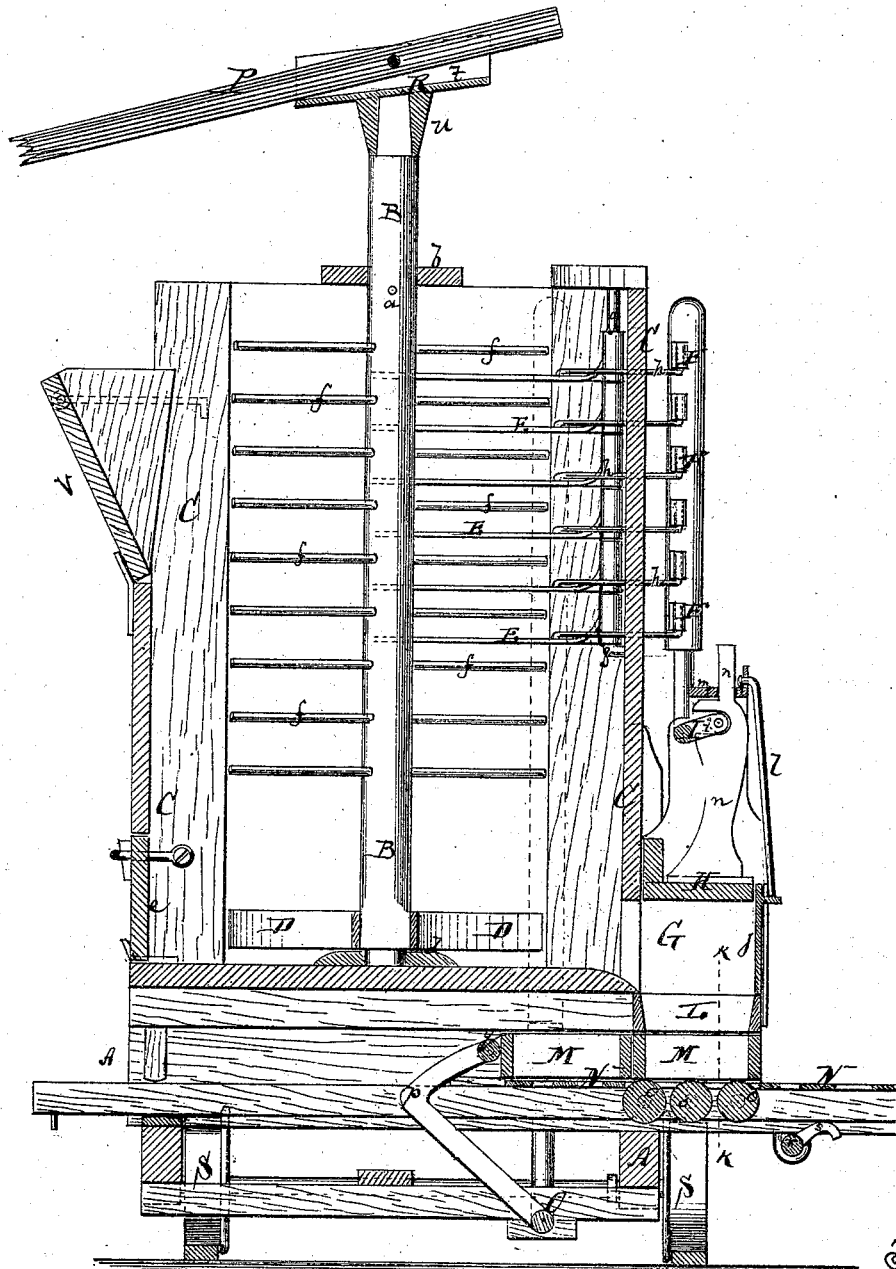
F. Alsip. Brick Machine.
No. 118,504. Fig. 3. Patented Aug. 29, 1871.

UNITED STATES PATENT OFFICE.

FRANK ALSIP, OF NORTH McGREGOR, IOWA.

IMPROVEMENT IN BRICK-MACHINES.

Specification forming part of Letters Patent No. 118,504, dated August 29, 1871.

*To all whom it may concern:*

Be it known that I, FRANK ALSIP, of North McGregor, in the county of Clayton and State of Iowa, have invented a new and Improved Brick-Machine; and I do hereby declare that the following is a full, clear, and exact description thereof, which will enable others skilled in the art to make and use the same, reference being had to the accompanying drawing forming part of this specification, in which—

Figure 1 represents a plan or top view of my improved brick-machine. Fig. 2 is a detail vertical transverse section of the same on the line *k k*, Fig. 3. Fig. 3 is a vertical central section of the machine on the line *c c*, Fig. 1.

Similar letters of reference indicate corresponding parts.

My invention consists in the improvement of brick-machines, as hereinafter fully described and subsequently pointed out in the claims.

A in the drawing represents the frame of my improved brick-machine. B is the vertical shaft hung in the same for stirring and mixing the clay. C is the box or mill in which the clay is put to be properly mixed by the stirrer. The shaft is made vertically adjustable, but is or may be held down by a pin, *a*, put into it below the upper cross-piece *b* of the box C. The lower end of the shaft enters a socket, *d*, or rests on a step fixed to the bottom of the box. The lower part of the shaft above the socket or step is squared to fit the square sleeve formed by the force-paddles D D, which are riveted or bolted together, as in Fig. 1, to form one united frame, which is revolved by the shaft. The said paddles are thus fitted loose to the shaft and can freely work upon the same to get over stones or lumps that may collect on the bottom of the box C. The paddles are, therefore, not as liable to break as those rigidly affixed to the shaft. By slightly raising the shaft when the pin *a* is removed the paddles will be liberated and can be removed for repair through an opening in the back of the box C, closed by a removable plate, *e*. Through the shaft B is fitted, above the force-paddles D, a series of pins, *f f*, in straight row, as shown. These pins, in passing through the clay, carry all lumps against a series of stops or arms, E E, arranged in one front corner of the box C. The arms E are all pivoted in the cover to an upright pin, *g*, there secured, and can swing separately on said pin *g*. Each arm E is, by a rod or chain, *h*, connected with a spring, F, which is secured to the front or side of the box, one such spring being provided for each arm E. The spring holds the free end of the arm in contact with the shaft B, as shown in Fig. 1, allowing the arm, however, to be swung back by stones or hard lumps to prevent breakage. Another good effect of the arms E is that they tend to detain the clay in front of the box and lower it at the back, thereby greatly relieving the party that supplies the box with clay. G is the mud-box arranged in front of the box C, and provided with a reciprocating plunger, H, which can be worked up and down by cams *i* on a rock-shaft, I. The front plate *j* of the mud-box is removable, and is held down by a pin, *l*, suspended from the cross-head *m* above the mud-box, said cross-head serving, also, as guide for the upright arms *n* of the plunger. By making the front plate *j* of the mud-box removable, as shown, the removal of roots or stones is facilitated. The grating L which forms the bottom of the mud-box, and through which the clay is pressed by the plunger into the molds, is made with smaller openings at the right than at the left-hand side, as indicated in Fig. 2. By the rotation of the shaft the clay is all crowded to the right, and in gratings having all the openings alike there is, consequently, more clay forced through the openings at the right than through those at the left. By regulating the sizes of the openings, as stated, the quantity of clay brought to the several molds will be equalized and the bricks, therefore, be of uniform quality. The molds M M are at one side of the machine placed upon a movable table, N, which extends under the grating of the mud-box and contains transverse rollers *o o*, to facilitate the movement of the molds over its face. A rock-shaft, O, hung in the lower part of the frame is provided with hook-shaped cranks *p p*, which carry at their ends a tranverse roller, *q*, by which the molds can be pushed forward in proper succession. The front part of the table N rests upon cams *s'* of a rock-shaft, *r*, whereby the molds can be lifted up against the grating whenever the plunger descends. The sweep P, for rotating the shaft B by horse-power, is made of a board, which is pivoted between the two flanges *t t* of a metal plate, R. To the bottom of this plate is secured a square socket, *u*, which fits the squared upper end of the shaft. In this way a cheap and durable sweep is obtained. The back of the mill C contains, also, a removable upper part, V, which permits the ready cleaning of the mill. The entire frame A rests on wheels S S and constitutes thus a truck which can be conveniently moved along a track or over the floor of a building or yard. All the parts are so arranged that the molds will be quite low, thereby greatly facilitating the handling of the mill.

Having thus described my invention, I claim as new and desire to secure by Letters Patent—

1. The force-paddles D, when loosely fitted to the angular lower ends of shaft B, as and for the purpose specified.

2. The series of straight rows of parallel pins $f$, arranged at intervals on the shaft B, in combination with stops E placed in a corner of the box, as and for the purpose specified.

3. The arrangement of the stops E upon the same upright pin $g$, but with a spring for each stop, as described, substantially as and for the purpose set forth.

4. The sweep P, constructed as described, pivoted between the flanges of plate R, substantially as and for the purpose specified.

F. ALSIP.

Witnesses:
P. N. TRAHN,
W. D. CROOKE.